J. F. GOODWIN.
ABUTMENT FOR VEHICLE SPRINGS.
APPLICATION FILED AUG. 2, 1917.
1,268,562.
Patented June 4, 1918.
2 SHEETS—SHEET 1.
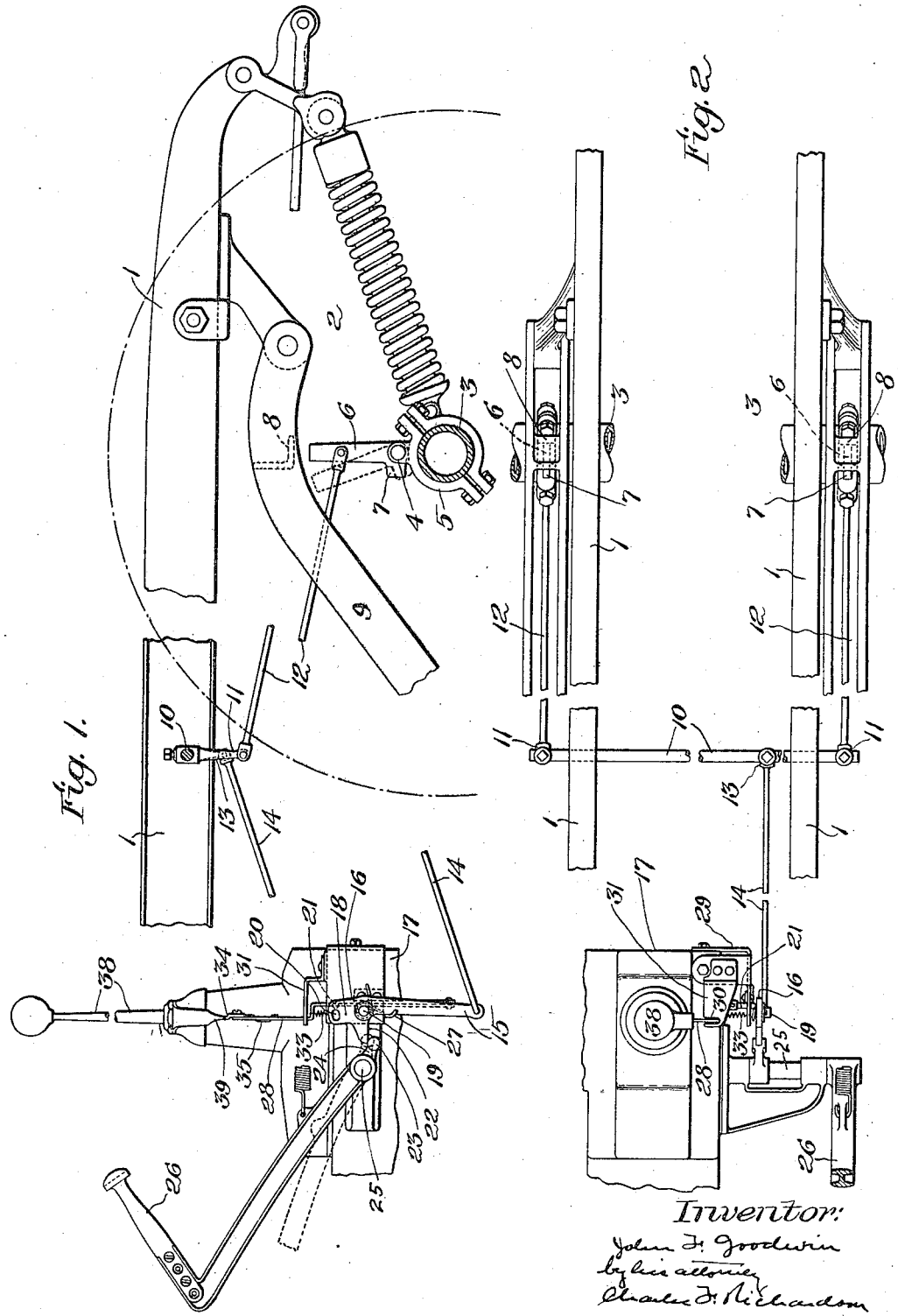
Inventor:
John F. Goodwin
by his attorney
Charles F. Richardson J. F. GOODWIN.
ABUTMENT FOR VEHICLE SPRINGS.
APPLICATION FILED AUG. 2, 1917.
1,268,562.
Patented June 4, 1918.
2 SHEETS—SHEET 2.
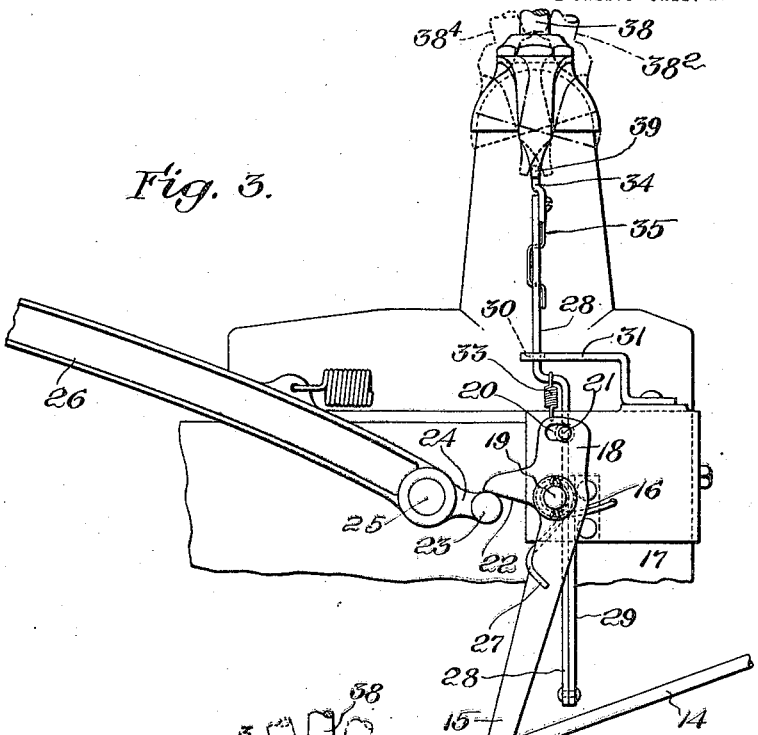
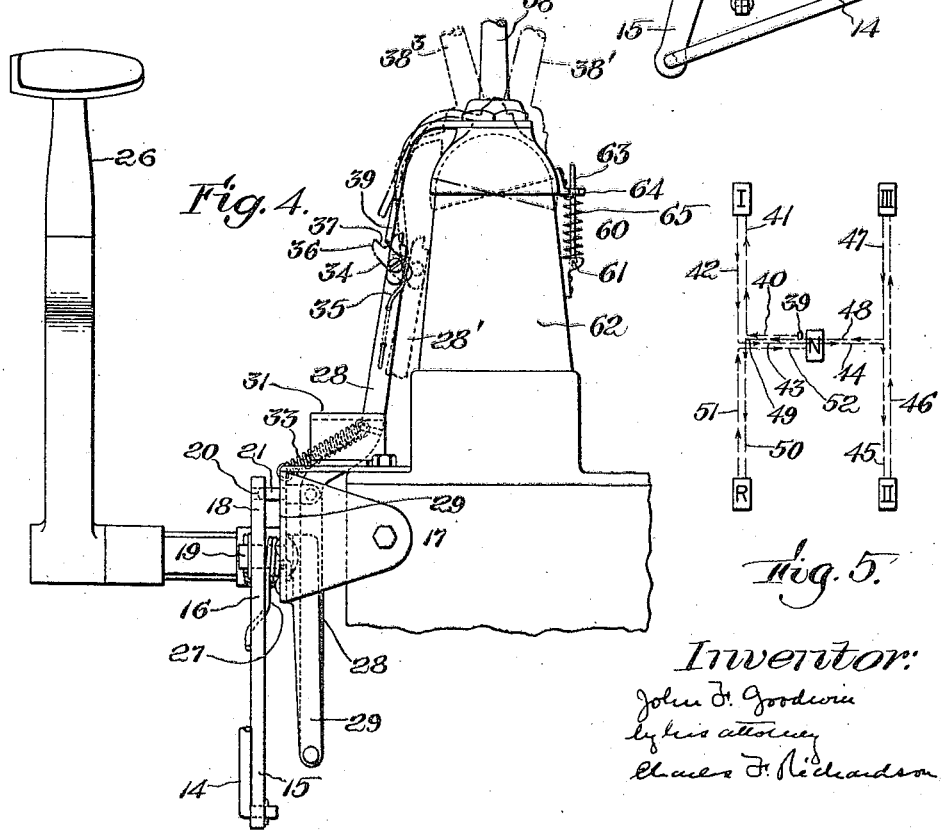
Inventor:
John F. Goodwin
by his attorney
Charles F. Richardson

UNITED STATES PATENT OFFICE.

JOHN F. GOODWIN, OF CHARLESTOWN, MASSACHUSETTS.

ABUTMENT FOR VEHICLE-SPRINGS.

1,268,562.

Specification of Letters Patent.

Patented June 4, 1918.

Application filed August 2, 1917. Serial No. 184,035.

*To all whom it may concern:*

Be it known that I, JOHN F. GOODWIN, a citizen of the United States, residing at Charlestown, in the county of Suffolk and State of Massachusetts, have invented certain new and useful Improvements in Abutments for Vehicle-Springs, of which the following is a specification, reference being had therein to the accompanying drawings.

My invention resides in means whereby an abutment may, through the movements of a foot clutch pedal and a hand control gear shifting lever, employed in starting or stopping, say, an automobile, be moved into or out of operative position, in relation to the spring.

It is particularly adapted for use with vehicles whose supporting springs, may be adjusted to various loads; and is designed to prevent the vehicle body from settling down too low in relation to the axle, if, for any reason, the springs should happen to be adjusted for a load less than that placed upon the vehicle body, and hence its supporting springs.

In the drawings illustrating the principle of my invention, and the best mode now known to me, of embodying the same in operative structure, Figure 1 is an elevation showing my invention, and so much of an automobile as constitutes the environment of my invention.

Fig. 2 is a plan thereof.

Figs. 3 and 4 are respectively, a front and an end elevation, in enlarged detail, of that portion of my invention employed in operating an abutment or jack in limiting the depression of the vehicle body due to overloading the vehicle springs having a predetermined tension.

Fig. 5 is a diagrammatic view showing the substantial paths taken by the unlocking finger moved by the hand control lever, in changing speeds of the vehicle.

The vehicle spring here shown and with which I have actually used my invention, is described in United States Letters Patent, No. 1,167,054 issued to William E. Eastman, January 4, 1916, but my invention is not necessarily limited to that style of spring.

A chassis 1, Figs. 1 and 2, is supported by spring-apparatus 2 operatively connected to the chassis and the wheel axle 3, in any well-known manner.

In a pair of ears 4 upon the top of, and integral with, a collar 5 fixed to the axle, is a jack member 6 pivoted at its bottom portion, and designed to be, normally, in a vertical position. Its base portion has a forwardly extending block 7 which allows a limited forward movement of the jack before the block engages the axle. When upright, the free end of the jack lies directly below a shoulder 8 fixed to a lever 9 which, for all practical purposes may be considered as fixed to the chassis.

Obviously, if the spring is given the proper tension for a predetermined load, the relative positions of the shoulder 8 and the jack 6 may be so arranged as to become engaged should an excessive load be placed upon the chassis, and thus prevent a further objectionable drop of the chassis in relation to the axle. Knowing this condition of affairs, the operator is supposed to remove any excess of load from the springs; or to increase the tension of the springs and thus accommodate them to the load. In other words, if the springs are adjusted for the vehicle to carry three persons, and six suddenly pile in, before the tension required for six persons, is given to the springs, the chassis' excessive downward movement will be limited by the stop and jack, and the operator will be given a chance to give the springs the tension needed for six passengers.

Now it is necessary that this jack should be in operative position only while the vehicle is standing still, and that it should be inoperative when the vehicle is moving; and it is my purpose to bring about these conditions by utilizing only those movements required of an operator in starting or stopping his automobile so that he will have to give no thought to the position of the jack.

A corresponding jack 6 is similarly arranged on the axle on the opposite side of the chassis, and has a similar shoulder 8 that it may engage. The jacks are operated simultaneously, by a cross bar 10 rotatably mounted in the two opposite side frames of the chassis, and having a pair of arms 11 depending from and fixed to the cross bar; these respective arms being operatively connected to their respective jacks by links 12. To give movement to the cross bar, it has a depending arm 13 fixed to it and having pivoted to its free end portion, a connecting link 14 which, in turn, is pivoted to the long arm 15 of the jack operating lever 16, forming part of the mechanism I will now describe.

This jack operating lever 16, Figs. 3 and 4, is pivoted to the side of the transmission casing 17 containing the shifting gears employed in changing the speeds of the automobile. The short arm 18, above its pivot 19, has a slot 20 to receive a lock bolt 21, and a bearing surface, Figs. 1 and 2, for the end of the bolt to engage, when it is not in the slot 20. Just in front of, but slightly above the pivot 19, this arm 18 has a cam surface 22 to be engaged by a roll 23 mounted upon an arm 24 fixed to the shaft 25 of a clutch pedal 26, used in a well-known manner to operate a clutch for connecting and disconnecting the engine shaft from the mechanism driving the wheels of the vehicle. A spring 27 always tends to move the jack lever 16, connecting links 12, 14, and jacks 6 rearwardly, and thus to hold the jacks in upright position; the block 7 on each jack engaging the axle, and limiting the rearward movement of the jack.

A locking lever 28, Figs. 3 and 4, has its end portion pivoted to a bracket 29 fast to the casing 17, and is movable in a plane at right angles to that of the jack operating lever 16, and is retained therein by a guide slot 30, Fig. 2, in the bracket 31. About midway its length is pivoted, the shouldered pivoted lock bolt 21 which passes through a hole in the bracket 29, and, as already stated, normally engages the inside face of the jack lever 16, the length of the bolt being such that when the bolt comes into alinement with, and moves into, the slot 20, the shoulder engages the rear face of the bracket. A coil spring 33 connected to the bracket, and the locking lever 28 tends to pull the latter, and hence the lock bolt 21 toward the jack operating lever 16. The free end portion of the locking lever extends upwardly, and to it, is pivoted a dog 34, flexibly movable in the plane of movement of the lever by reason of a flat spring 35 which engages the rear plane surface of the dog. The forward face 36 of the dog is curved upwardly and rearwardly, while its rear face 37 is a plane.

To the hand controlled lever 38 is fixed an unlocking finger 39, Figs. 3 and 4, which, while the car is standing still, has its free end portion lie in front of the curved surface 36 of the dog 34 on the lock lever 28.

As is well understood, the manually operated gear shifting lever 38, may be moved not only forward and back, on either side of its normal position, but also crosswise in the plane of movement of the locking bolt lever through its normal position. See dotted lines in Figs. 3 and 4.

It is also to be remembered that this lever has some play to the right and left of normal position 38, Fig. 4, which is not enough, however, to have any effect upon the gear shifting. A spring device 60, taking advantage of this free play, is provided, tending to move the lever to the left, and hence cause the finger 39 to engage the front face 36 of the dog 34, and remove the bolt 21 from the slot 20, against the tension of the spring 33. This device consists of a bracket 61, fixed to the standard 62, and having pivoted to it, by means of a ball and socket joint, a rod 63 the free end of which loosely slides in a slot, formed in a second bracket 64, operatively secured to the gear shifting lever 38. A coil spring 65 is mounted upon this rod, and compressed between said brackets, so that the spring tends to cause the lever 38 to move toward the position $38^3$, Fig. 4. This spring is of sufficient strength to overcome the opposing spring 33, and, when the lever is left, in normal position, by the operator, moves and holds the bolt 21 out of engagement with the slot 20 in the jack lever 16.

I will now describe the operation of my invention. The engine is running. The operator is ready to start the car; he learning that it is properly loaded, has no thought of the jacks. The parts are all in the positions shown in Figs. 1 and 2. He is intent upon starting the car, and goes through the usual operations. He presses forward the clutch pedal 26, Fig. 1; in so doing the roll 23 on the arm 24 of the pedal, engages the under surface 22 of the forward projecting portion of the jack operating lever 16. The short arm 18 moves rearwardly, and the long arm 15 forwardly, thereby, through the connecting links 12 and 14, moving each jack forward out of the vertical path of its respective shoulder 8, until it is stopped by the block 7 on the base of the jack. But as the short arm 18 of the jack operating lever 16 moves rearwardly, its lock slot 20 comes into alinement with the end of the lock bolt 21, which has been pressing against the inner face of the short arm 18, by the spring 33, and the latter snaps the bolt into the slot; the spring causing the rear end of the slot to bear against the lock bolt as is shown in Fig. 3. Meanwhile the operator has manually moved the control lever 38, Fig. 4, from normal position, to the right to position $38^1$, Fig. 4, and then to the rear, into first speed position $38^2$, Fig. 3, the car beginning to move; but in these movements of the control lever, the finger 39 being just in front of, and contacting the curved face 36 of the dog 34, Fig. 4, on the control lever, moves transversely from normal position N, Fig. 5, in path 40. When the control lever 38 is pulled rearwardly, the finger moving forward in path 41, to position I, for first speed, in a plane in front of the dog of the locking bolt lever.

In changing from low speed to second speed the clutch pedal 26 is again pressed forward, and the control lever 38 also moved forward to mid-position 38, Fig. 3, and 38¹, Fig. 4, thus returning and leaving the finger, by path 42, Fig. 5, in front of the dog. The control lever is then moved transversely through normal position 38, Fig. 4, and the finger 39 engages the curved surface 36, of the dog, forces the dog and the lock lever inwardly, along path 43, Fig. 5, to normal position N, thus withdrawing the lock bolt 21, Figs. 3 and 4 from the slot 20, which remains in alinement with the bolt, because of the engagement of the roll 23 of the clutch pedal 26, with surface 22 of the jack operating lever 16. The movement of the control lever is continued to the left, across neutral position, to position 38³, Fig. 4, the finger still engaging the curved face of the dog and forcing the lock lever 28 into position 28¹; the lever is then moved forward to position 38⁴, Fig. 3, the finger following path 44 and 45, to speed position II Fig. 5, disengaging the dog; and the bolt 21, again being snapped by the spring controlled lock lever, into the slot 20 held in alinement with the bolt, by the clutch pedal 26. The plane of the next movement of the finger is now behind the dog.

Should the third or high speed be required, the clutch pedal is pressed forward, as before, and the control lever pulled rearwardly in the same plane, through and past mid-position, to position 38², Fig. 3, 38³, Fig. 4, thus carrying the finger forwardly in path 46, in the same plane, but at the rear, of the dog, to position III, Fig. 5.

Now to stop the car, when the gearing is set for second or third speed, the clutch pedal is moved as usual, the jack operating lever remaining locked; and the control lever moved forwardly or rearwardly as the case may be, to mid-position and then transversely to normal position; the finger 39 returning by paths 46 or 47, and 48, Fig. 5, to a point in front of the dog, when it engages the latter and moves the bolt 21 out of the slot 20 as already explained. The jack lever 16, being freed, snaps the jack member 6 into a vertical position to engage the shoulder 8, Fig. 1, should an excessive load be placed upon the chassis after the automobile had stopped.

It will be observed that in all of the forward, and the back movements of the control lever, the unlocking finger has passed both in front and behind the dog on the locking lever, and that in stopping the car, when the gears are set for second speed, the control lever, instead of being moved rearward to the high speed position, is stopped at mid-position and moved into neutral position with the same results as were obtained by moving forward from high position and then into neutral position.

When the control lever is moved into position to reverse the movement of the automobile, that is from position 38, to position 38¹, 38⁴, Figs. 1, 3 and 4, the path described by finger is 49, 50, to reverse position R; the lock bolt 21 snapping into the slot 20, upon the movement of the pedal and the control lever, in a way already pointed out. To stop the car, the control lever is moved rearward to mid-position and returned to normal, the finger returning by path 51, Fig. 5, in front of the dog, and then by path 52, moving the dog and lock lever and the bolt inward, thereby unlocking the jack lever, as in the case of stopping the car when the gearing is set at first speed; and allowing the jack to assume operative position, and the lock bolt to press against the inner surface of the jack lever, as shown in Figs. 1 and 2.

It is to be noted again, that when the operator leaves the control lever in normal position 38, the spring device 60 through the action of its spring 64, at once moves and holds lock bolt 21 out of engagement with its corresponding slot 20 in the jack lever 18, and allows the latter, by means of its spring 27, to move the jack into vertical operative position.

In fine, the jacks have assumed inoperative and operative positions respectively, upon the starting and the stoppage of the car, by the ordinary and necessary movements of the pedal and the gear shifting lever; and with the operator's thoughts directed only to starting and stopping the car.

Having described the construction and operation of the features of my invention, and desiring to protect the same in the broadest manner legally possible,

What I claim is:

1. In an automobile, a foot pedal, and a hand lever, operated in connecting and disconnecting the motor shaft from the driven mechanism; an abutment movably mounted between the automobile body and one of its axles; a lever operatively connected therewith; the forward movement of the pedal moving said lever and causing said abutment to move out of position to be engaged by said body; a spring operated lock bolt to engage said lever and hold it and said abutment out of operative position; and means whereby a movement of the hand lever will release said lock bolt, and permit it to engage said lever and hold said abutment out of operative position; and a movement of the hand lever through normal position, will withdraw said bolt from said lever, and permit the latter to return to normal position, and thereby move the abutment into operative position whenever the driving shaft and the driven mechanism become disconnected, that is whenever the automobile stops.

2. In an automobile, a foot pedal, and a hand lever operated in connecting and disconnecting the motor shaft from the driven mechanism; an abutment movably mounted between the automobile body and one of its axles; a lever operatively connected therewith; the forward movement of the pedal moving said lever and causing said abutment to move out of position to be engaged by said body; a spring operated lock bolt lever; a lock bolt pivoted to said lock bolt lever to engage said lever and hold it and said abutment out of operative position; a dog flexibly mounted on the free end of said lock bolt lever; and a finger fixed to the hand lever to engage said dog to move the lock bolt lever in one direction to withdraw the bolt; whereby a movement of the hand lever will release said lock bolt, and permit it to engage said lever and hold said abutment out of operative position; and a movement of the hand lever through normal position, will withdraw said bolt from said lever, and permit the latter to return to normal position, and thereby move the abutment into operative position whenever the driving shaft and the driven mechanism become disconnected, that is whenever the automobile stops.

In testimony whereof I affix my signature in presence of two witnesses.

JOHN F. GOODWIN.

Witnesses:
CHARLES F. RICHARDSON,
RALPH W. BARTLETT.

Copies of this patent may be obtained for five cents each, by addressing the "Commissioner of Patents, Washington, D. C."